United States Patent
Ohta et al.

(10) Patent No.: US 7,696,300 B2
(45) Date of Patent: Apr. 13, 2010

(54) OXYGEN-ABSORBING RESIN, OXYGEN-ABSORBING RESIN COMPOSITION AND OXYGEN-ABSORBING CONTAINER

(75) Inventors: Yoshihiro Ohta, Kanagawa (JP); Yoichi Ishizaki, Kanagawa (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 12/123,569

(22) Filed: May 20, 2008

(65) Prior Publication Data

US 2008/0227912 A1    Sep. 18, 2008

Related U.S. Application Data

(63) Continuation of application No. PCT/JP2006/322994, filed on Nov. 17, 2006.

(30) Foreign Application Priority Data

| Nov. 21, 2005 | (JP) | ............................ 2005-336123 |
| Jun. 1, 2006 | (JP) | ............................ 2006-153644 |
| Jul. 11, 2006 | (JP) | ............................ 2006-190568 |

(51) Int. Cl.
*C08G 63/00* (2006.01)

(52) U.S. Cl. ....................... 528/307; 528/271; 528/272; 528/308; 428/35.4; 428/35.7; 428/480

(58) Field of Classification Search ................. 528/271, 528/272; 428/480, 483, 35.4, 35.5, 35.7, 428/36.6, 36.7, 35.2, 34.1, 35.9, 315.9, 36.8, 428/475.5

See application file for complete search history.

(56) References Cited

FOREIGN PATENT DOCUMENTS

| JP | 54-128183 | 10/1979 |
| JP | 54-1281823 | 10/1979 |
| JP | 62-1824 | 1/1987 |
| JP | 8-502306 | 3/1996 |
| JP | 2001039475 | 2/2001 |
| JP | 3183704 | 4/2001 |
| JP | 2003-521552 | 7/2003 |
| JP | 2003-253131 | 9/2003 |
| WO | 2005105887 A1 | 11/2005 |

*Primary Examiner*—Ling-Siu Choi
*Assistant Examiner*—Frances Tischler
(74) *Attorney, Agent, or Firm*—Hoffmann & Baron, LLP

(57) ABSTRACT

Disclosed is an oxygen-absorbing resin which exhibits excellent oxygen absorption performance even in the absence of a transition metal catalyst. Specifically disclosed is an oxygen-absorbing resin which is composed of a copolyester obtained by copolymerizing at least the following monomers (A)-(C). Monomer (A): a dicarboxylic acid or a derivative thereof having a carbon atom bonded to both the structures (a) and (b) below and also bonded to one or two hydrogen atoms, wherein the carbon atom is contained in an alicyclic structure (a) a carbon-carbon double bond group (b) any one of a functional group containing a heteroatom or a linking group derived from such a functional group, a carbon-carbon double bond group and an aromatic ring; Monomer (B): at least one selected from the group consisting of a dicarboxylic acid having an aromatic ring or a derivative thereof, and a hydroxycarboxylic acid having an aromatic ring or a derivative thereof; Monomer (C): a diol.

22 Claims, No Drawings

OXYGEN-ABSORBING RESIN, OXYGEN-ABSORBING RESIN COMPOSITION AND OXYGEN-ABSORBING CONTAINER

CROSS-REFERENCE TO RELATED APPLICATIONS

This application is a continuation of international Application No. PCT/JP2006/322994, flied Nov. 17, 2006, which claims priority to Japanese Patent Application No. 2005-336123, filed Nov. 21, 2005, Japanese Patent Application No. 2006-153644, flied Jun. 1, 2006, and Japanese Patent Application No. 2006-190568, filed Jul. 11, 2006, the contents of each of which are incorporated herein by reference.

TECHNICAL FIELD

The present invention relates to an oxygen-absorbing resin, an oxygen-absorbing resin composition containing the same and an oxygen-absorbing resin container prepared using the resin.

BACKGROUND OF THE INVENTION

Presently, various plastic containers are used for packaging because of their advantages such as light weight, transparency and easiness of molding.

However, because an oxygen barrier property of the plastic containers is lower than those of metal containers and glass containers, the plastic containers have problems in that the contents of the containers deteriorate due to chemical oxidation and the action of aerobic bacteria.

For preventing these problems the plastic container walls have a multi-layer structure in which at least one layer is made of a resin having an excellent oxygen barrier property such as an ethylene-vinyl alcohol copolymer. In addition, there are other kinds of containers having an oxygen-absorbing layer for absorbing oxygen remaining in the containers and also oxygen penetrating into the containers from the outside. Oxygen absorbers (deoxidizers) used for the oxygen-absorbing layer include, for example, those mainly containing a reducing substance such as iron powder (see, for example, Japanese Examined Patent Publication (JP KOKOKU) No. Sho 62-1824).

A method in which an oxygen absorber such as iron powder is incorporated into a resin and the resulting resin composition is used as a material for the wall of a container used as a packaging material shows a sufficiently high ability to absorb oxygen, but the resulting resin composition has a color hue peculiar to the iron powder. Therefore, said method is limited in its application and cannot be used in the field of packaging in which transparency is required.

Further, there have been disclosed, as a resin-based oxygen-absorbing material, an oxygen-absorbing resin composition comprising a resin having a carbon-carbon unsaturated bond and a transition metal catalyst (see, for example, Japanese Un-Examined Patent Publication (JP KOKAI) No. 2001-39475, Japanese Un-Examined Patent Publication (JP KOHYO) No. Hei 8-502306 and Japanese Patent No. 3,183, 704) and an oxygen-absorbing resin composition comprising a resin having a cyclic olefin (cyclohexene) structure and a transition metal catalyst (in particular, a Co salt) (see, for example, Japanese Un-Examined Patent Publication (JP KOHYO) No. 2003-521552 and Japanese Un-Examined Patent Publication (JP KOKAI) No. 2003-253131). However, the former composition has a problem in that the molecular chain of the resin is cleaved as the resin absorbs oxygen and thus low molecular weight organic components are generated as an odor component. On the other hand, the latter composition comprises ring structures as the oxygen-absorbing sites, and thus it could somewhat inhibit the generation of such low molecular weight organic (odor) components, but there is a tendency that the use of such a transition metal catalyst (a Co salt) may easily result in the occurrence of reactions at sites other than the expected oxygen-absorbing sites and this in turn leads to the formation of decomposition products.

SUMMARY OF THE INVENTION

Accordingly, it is an object of the present invention to provide an oxygen-absorbing resin which shows an excellent ability to absorb oxygen even in the absence of any transition metal catalyst.

The present invention provides an oxygen-absorbing resin which is a copolyester obtainable by copolymerizing at least the following monomers (A)-(C):

monomer (A): a dicarboxylic acid or derivative thereof comprising a carbon atom bonded to both of the following structures (a) and (b) and further bonded to one or two hydrogen atoms, the carbon atom being contained in an alicyclic structure:

(a) a carbon-carbon double bond group; and
(b) either a heteroatom-containing functional group, a bonding group derived therefrom, a carbon-carbon double bond group, or an aromatic ring;

monomer (B): at least one member selected from the group consisting of dicarboxylic acids comprising an aromatic ring, derivatives thereof, hydroxycarboxylic acids comprising an aromatic ring and derivatives thereof; and monomer (C): diol.

The present invention also provides an oxygen-absorbing resin which is obtainable by copolymerizing at least the following monomers (A') and (B') and has a glass transition temperature in the range of −8 to 15° C.:

monomer (A'): a monomer comprising a carbon atom bonded to both of the following structures (a) and (b) and further bonded to one or two hydrogen atoms, the carbon atom being contained in an alicyclic structure:

(a) a carbon-carbon double bond group; and
(b) either a heteroatom-containing functional group, a bonding group derived therefrom, a carbon-carbon double bond group, or an aromatic ring; and monomer (B'): a monomer comprising an aromatic ring.

The present invention also provides an oxygen-absorbing resin composition comprising the foregoing oxygen-absorbing resin.

The present invention also provides an oxygen-absorbing container comprising an oxygen-absorbing layer consisting of the foregoing oxygen-absorbing resin or the foregoing oxygen-absorbing resin composition.

The oxygen-absorbing resin and oxygen-absorbing resin composition according to the present invention show an excellent ability to absorb oxygen even in the absence of any transition metal catalyst, and thus they could enable the realization of oxygen-absorbing materials showing practically acceptable oxygen-absorbing ability while effectively inhibiting the generation of any low molecular weight odor component.

DETAILED DESCRIPTION OF THE PREFERRED EMBODIMENTS

The oxygen-absorbing resin according to the present invention is a copolyester obtainable by copolymerizing at least, the following monomers (A)-(C):

monomer (A): a dicarboxylic acid or derivative thereof comprising a carbon atom bonded to both of the following structures (a) and (b) and further bonded to one or two hydrogen atoms, the carbon atom being contained in an alicyclic structure:
  (a) a carbon-carbon double bond group; and
  (b) either a heteroatom-containing functional group, a bonding group derived therefrom, a carbon-carbon double bond group, or an aromatic ring;

monomer (B): either a dicarboxylic acid comprising an aromatic ring, a derivative thereof, a hydroxycarboxylic acid comprising an aromatic ring, or a derivative thereof; and monomer (C): diol.

The alicyclic structure of monomer (A) may be a heterocyclic structure containing a heteroatom in the ring. Alternatively, the alicyclic structure may be either a monocyclic or polycyclic one and if it is a polycyclic ring structure, the rings other than those containing the foregoing carbon atom may be aromatic rings. The alicyclic structure is preferably a 3- to 12-membered monocyclic or polycyclic structure, more preferably a 5- or 6-membered monocyclic structure and further preferably a 6-membered monocyclic structure. The 3- and 4-membered cyclic structures have a high strain energy, and thus they are liable to easily cause the opening of rings to form a linear chain structure. Regarding a 7- or more membered cyclic structure, the synthesis thereof becomes more and more difficult as the size of the ring increases, and thus it would be unfavorable for industrial use. Particularly, the 6-membered cyclic structures are stable from the viewpoint of energy and can also be easily synthesized, and thus they are preferable. Moreover, the foregoing alicyclic structure contains a carbon atom bonded to both of the structures (a) and (b) and further bonded to one or two hydrogen atoms, and preferably a carbon double bond group of the structure (a) is contained in the alicyclic structure.

The hetero atom-containing functional group or the bonding group derived therefrom of the structure (b) includes for example a hydroxyl group, carboxyl group, formyl group, amido group, carbonyl group, amino group, ether bond, ester bond, amido bond, urethane bond and urea bond. A functional group comprising an oxygen atom as the hetero atom or bonding group derived therefrom is preferable, and includes for example the hydroxyl group, carboxyl group, formyl group, amido group, carbonyl group, ether bond, ester bond, amido bond, urethane bond and urea bond. The carboxyl group, carbonyl group, amido group, ester bond and amido bond are more preferable. The monomer (A) having these functional groups and bonding groups can be prepared through relatively simple synthetic reactions, and thus they are advantageous for industrial use.

The aromatic ring of the structure (b) includes for example a benzene ring, naphthalene ring, anthracene ring, phenanthracene ring and diphenyl ring. The benzene ring and naphthalene ring are preferable, and the benzene ring is more preferable.

In addition, the carbon atom bonded to both of the structures (a) and (b) and included in the alicyclic structure is preferably bonded to one hydrogen atom. If one of the two hydrogen atoms bonded to a carbon atom is replaced by for example an alkyl group, and as a result the carbon atom is bonded to one hydrogen atom, the resulting resin would be further improved in its ability to absorb oxygen. In this connection, the derivative includes esters, acid anhydrides, acid halides, substitution products and oligomers.

The monomer (A) is preferably a derivative of tetrahydrophthalic acid or tetrahydrophthalic anhydride, more preferably a derivative of $\Delta^3$-tetrahydrophthalic acid or $\Delta^3$-tetrahydrophthalic anhydride and further more preferably 4-methyl-$\Delta^3$-tetrahydrophthalic acid or 4-methyl-$\Delta^3$-tetrahydrophthalic anhydride. The derivative of tetrahydrophthalic anhydride can be quite easily synthesized by the Diels-Alder reaction of maleic anhydride with a diene such as butadiene, isoprene or piperylene. For example, products have been manufactured by subjecting a mixture of cis-3-methyl-$\Delta^4$-tetrahydrophthalic anhydride and 4-methyl-$\Delta^4$-tetrahydrophthalic anhydride, which are prepared by reacting $C_5$-cut of the naphtha mainly comprising trans-piperylene and isoprene with maleic anhydride, to the stereoisomerization reaction or the structural isomerization reaction. These products are commercially available at a low price, and thus they are preferable from the viewpoint of industrial use. 4-Methyl-$\Delta^3$-tetrahydrophthalic acid obtained by the structural isomerization of 4-methyl-$\Delta^4$-tetrahydrophthalic acid is preferable as the monomer (A). The other monomer (A) includes exo-3,6-epoxy-1,2,3,6-tetrahydrophthalic anhydride.

The diol of monomer (C) includes for example ethylene glycol, diethylene glycol, triethylene glycol, polyethylene glycol, propylene glycol, dipropylene glycol, polypropylene glycol, 1,3-butanediol, 1,4-butanediol, 1,5-pentanediol, 1,6-hexanediol, 1,7-heptanediol, 1,8-octanediol, 1,9-nonanediol, neopentyl glycol, 1,4-cyclohexane dimethanol, 2-phenylpropanediol, 2-(4-hydroxyphenyl)ethylalcohol, α,α-dihydroxy-1,3-diisopropylbenzene, o-xylene glycol, m-xylene glycol, p-xylene glycol, α,α-dihydroxy-1,4-diisopropylbenzene, hydroquinone, 4,4-dihydroxydiphenyl, naphthalenediol or derivatives thereof. Aliphatic diols such as diethylenediol, triethylenediol, 1,4-butanediol, 1,6-hexanediol are preferable, and 1,4-butanediol is more preferable. If 1,4-butanediol is used, the resulting resin has a high ability to absorb oxygen and a small amount of decomposition products generated in the course of oxidation. One of these diols or any combination of at least two of them may be used.

If the combination of at least two of the above diols is used, the combination of 1,4-butanediol and an aliphatic diol having 5 or more carbon atoms is preferable, and the combination of 1,4-butanediol and 1,6-hexanediol is more preferable. A glass transition temperature of the resulting oxygen-absorbing resin can be easily controlled by using such combinations. If the combination of 1,4-butanediol and an aliphatic diol having 5 or more carbon atoms is used, the ratio of 1,4-butanediol to said aliphatic diol is preferably 70:30 to 99:1 (mol %), and more preferably 80:20 to 95:5 (mol %).

The dicarboxylic acids comprising an aromatic ring or derivatives thereof of monomer (B) include benzenedicarboxylic acids such as phthalic anhydride, isophthalic acid and terephthalic acid, naphthalenedicarboxylic acids such as 2,6-naphthalenedicarboxylic acid, anthracenedicarboxylic acids, phenyl malonic acid, phenylenediacetic acids, phenylenedibutyric acids, bis(p-carboxyphenyl)methane, 4,4'-diphenyletherdicarboxylic acids, p-phenylenedicarboxylic acids and derivatives thereof. Dicarboxylic acids in which a carboxyl group is directly bonded to an aromatic ring or derivatives thereof are preferable and include phthalic anhydride, isophthalic acid, terephthalic acid, 2,6-naphthalenedicarboxylic acid and derivatives thereof. In this connection, said derivatives include esters, acid anhydrides, acid halides, substitution products and oligomers. One of these dicarboxylic acids and derivatives thereof or any combination of at least two of them may be used. In particular, it is preferred that monomer (B) comprises terephthalic acid and further preferred that monomer (B) comprises terephthalic acid and isophthalic acid.

The hydroxycarboxylic acids comprising an aromatic ring or derivatives thereof of monomer (B) include 2-hydroxybenzoic acid, 3-hydroxybenzoic acid, 4-hydroxybenzoic acid, 2,6-hydroxynaphthoic acid, 2-hydroxyphenylacetic acid, 3-hydroxyphenylacetic acid, 4-hydroxyphenylacetic acid, 3-(4-hydroxyphenyl)butyric acid, 2-(4-hydroxyphenyl)butyric acid, 3-hydroxymethylbenzoic acid, 4-hydroxymethylbenzoic acid, 4-(hydroxymethyl)phenoxyacetic acid, 4-(4-hydroxyphenoxy)benzoic acid, (4-hydroxyphenoxy)acetic acid, (4-hydroxyphenoxy)benzoic acid, mandelic acid, 2-phenyllactic acid, 3-phenyllactic acid and derivatives thereof. Hydroxycarboxylic acids in which a carboxyl group and a hydroxyl group are directly bonded to an aromatic ring or derivatives thereof are preferable and include 3-hydroxybenzoic acid, 4-hydroxybenzoic acid and derivatives thereof. In this connection, said derivatives include esters, acid anhydrides, acid halides, substitution products and oligomers. One of these dicarboxylic acids and derivatives thereof or any combination of at least two of them may be used.

By copolymerizing monomer (B) in addition to monomers (A) and (C), a copolyester preventing gelation and having a high degree of polymerization can be obtained and thus extrusion moldability is improved. In addition, the copolyester's Tg increases while its crystallinity increases and thus the handling ability during the molding is improved. That is, the resulting resin has a high ability to absorb oxygen, a small amount of decomposition products, and excellent extrusion moldability and handling ability.

The oxygen-absorbing resin according to the present invention can be obtained by copolymerizing monomers (A) to (C). The polymerization may be carried out according to any method known to those skilled in the art. For example, the polymerization may be carried out by interfacial polycondensation, solution polycondensation, molten polycondensation or solid phase polycondensation.

If the dicarboxylic acid comprising an aromatic ring or a derivative thereof is used as monomer (B), the amount of monomer (A) unit in the resulting resin is preferably 5 to 40 mol %, more preferably 7.5 to 35 mol %, and further more preferably 10 to 30 mol % of all monomer units contained in the resin, in this case, the amount of monomer (B) unit is preferably 10 to 45 mol %, more preferably 15 to 42.5 mol %, and further more preferably 20 to 40 mol %. If said amounts are within the above ranges, the resulting resin has improved handling ability and a high ability to absorb oxygen.

If the hydroxycarboxylic acid comprising an aromatic ring or a derivative thereof is used as monomer (B), the relative proportions of monomers (A) and (B) may be appropriately selected by those skilled in the art.

In addition to the above monomers (A) to (C), a monomer selected from the group consisting of aliphatic dicarboxylic acids, aliphatic hydroxycarboxylic acids, polyalcohols, polycarboxylic acids and derivatives thereof may be copolymerized. Among them, in particular, it is preferred that in addition to the above monomers (A) to (C), monomer (D) selected from the group consisting of aliphatic dicarboxylic acids, aliphatic hydroxycarboxylic acids and derivatives thereof be copolymerized. One of these monomers or any combination of at least two of them, may be used. By copolymerizing monomer (D), a glass transition temperature of the resulting oxygen-absorbing resin can be easily controlled.

The aliphatic dicarboxylic acids and derivatives thereof include oxalic acid, malonic acid, succinic acid, glutaric acid, adipic acid, pimelic acid, suberic acid, azelaic acid, sebacic acid, undecane diacid, dodecane diacid, 3,3-dimethylpentane diacid and derivatives thereof. Among them, adipic acid and succinic acid are preferable, and adipic acid is particularly preferable.

The aliphatic hydroxycarboxylic acids and derivatives thereof include glycolic acid, lactic acid, hydroxypivalic acid, hydroxycaproic acid, hydroxyhexanoic acid and derivatives thereof.

The polyalcohols and derivatives thereof include 1,2,3-propanetriol, sorbitol, 1,3,5-pentanetriol, 1,5,8-heptanetriol, trimethylolpropane, pentaerythritol, neopentyl glycol, 3,5-dihydroxybenzyl alcohol and derivatives thereof.

The polycarboxylic acids and derivatives thereof include 1,2,3-propanetricarboxylic acid, meso-butane-1,2,3,4-tetracarboxylic acid, citric acid, trimellitic acid, pyromellitic acid and derivatives thereof.

The oxygen-absorbing resin according to the present invention can be obtained as copolyester by copolymerizing monomers (A) to (D). In this case, the amount of monomer (D) unit in the resulting resin is preferably 1 to 25 mol %, more preferably 1 to 15 mol %, and further more preferably 2 to 10 mol % of all monomer units contained in the resin.

A glass transition temperature of the oxygen-absorbing resin according to the present invention obtained by copolymerizing monomers (A) to (C) or monomers (A) to (D) is preferably in the range of $-8°$ C. to $15°$ C., more preferably in the range of $-8°$ C. to $10°$ C., and further more preferably in the range of $-5°$ C. to $8°$ C. If said glass transition temperature is within the above range, the oxygen-absorbing resin according to the present invention has an excellent ability to absorb oxygen, especially in the early stage.

The oxygen-absorbing resin according to the present invention is an oxygen-absorbing resin which is obtainable by copolymerizing at least the following monomers (A') and (B') and has a glass transition temperature in the range of $-8$ to $15°$ C.:

monomer (A'): a monomer comprising a carbon atom bonded to both of the following structures (a) and (b) and further bonded to one or two hydrogen atoms, the carbon atom being contained in an alicyclic structure:

(a) a carbon-carbon double bond group; and (b) either a heteroatom-containing functional group, a bonding group derived therefrom, a carbon-carbon double bond group, or an aromatic ring; and monomer (B'): a monomer comprising an aromatic ring.

Compounds having a polymerizable functional group or a functional group which can be bonded to a polymer main chain and the like can be used as monomer (A'). The polymerizable functional group and functional group which can be bonded to a polymer main chain include a hydroxyl group, carboxyl group, amido group, formyl group, isocyanate group, epoxy group, vinyl group, acryl group, methacryl group, halogen group and derivatives thereof. In particular, monomer (A') is preferably dicarboxylic acids or derivatives thereof. The dicarboxylic acids and derivatives thereof can easily be polymerized as a raw material monomer of polyester, polyamide or the like. In this case, the above-mentioned monomer (A) can preferably be used as monomer (A').

Compounds having a polymerizable functional group or a functional group which can be bonded to a polymer main chain and the like can be used as a monomer comprising an aromatic ring of monomer (A'). The polymerizable functional group and functional group which can be bonded to a polymer main chain include a hydroxyl group, carboxyl group, amido group, formyl group, isocyanate group, epoxy group, vinyl group, acryl group, methacryl group, halogen group and derivatives thereof. In particular, monomer (B') is preferably dicarboxylic acids, derivatives thereof, hydroxycarboxylic acids or derivatives thereof, and more preferably dicarboxylic acids or derivatives thereof. The dicarboxylic acids and derivatives thereof can be easily polymerized as a raw material monomer of polyester, polyamide. In this case, the above-mentioned monomer (B) can preferably be used as monomer (B').

The oxygen-absorbing resin according to the present invention which can be obtained by at least copolymerizing monomers (A') and (B') includes for example a resin in which a monomer (A') unit and a monomer (B') unit are linked with each other through any bonding group, a pendant type resin in which a monomer (B') unit is linked with a polymer main chain comprising a monomer (A') unit through any bonding group, a pendant type resin in which a monomer (A') unit is linked with a polymer main chain comprising a monomer (B') unit through any bonding group, and a pendant type resin in which a monomer (B') unit and a monomer (A') unit are linked with any polymer main chain through any bonding group.

The resin in which at least a monomer (A') unit and a monomer (B') unit are linked with each other through any bonding group includes polyesters, polyamides, polyethers and polyurethane.

For example, by using monomers (B') in addition to (A') to polymerize polyester, a resin preventing gelation during the polycondensation and having high degree of polymerization can be obtained and thus extrusion moldability is improved. In addition, the resin's crystallinity increases while the blocking of resin pellets is prevented and thus its handling ability during the molding is improved. Furthermore, the resin has an improved mechanical strength. That is, the resulting resin has a high ability to absorb oxygen, a small amount of decomposition products, excellent extrusion moldability, excellent handling ability and excellent mechanical strength.

A glass transition temperature of the oxygen-absorbing resin according to the present invention which can be obtained by polymerizing at least monomers (A') and (B') is preferably in the range of −8° C. to 15° C., more preferably in the range of −8° C. to 10° C., and further more preferably in the range of −5° C. to 8° C. If said glass transition temperature is within the above range, the oxygen-absorbing resin according to the present invention has an excellent ability to absorb oxygen, especially in the early stage.

When the oxygen-absorbing resin according to the present invention is synthesized, a polymerization catalyst is not necessarily used, but for example if the oxygen-absorbing resin according to the present invention is polyester, it is possible to use usual polyester polymerization catalysts such as titanium-containing, germanium-containing, antimony-containing, tin-containing and aluminum-containing polymerization catalysts. In addition, it is also possible to use any known polymerization catalysts such as nitrogen atom-containing basic compounds, boric acid, boric acid esters, and organic sulfonic acid type compounds.

Moreover, when polymerizing the foregoing monomers, various kinds of additives such as coloration-inhibitory agents and/or antioxidants such as phosphate-containing compounds can be used. The addition of an antioxidant would permit the control of any absorption of oxygen during the polymerization of the monomers and the subsequent molding steps and this in turn permits the inhibition of any quality-deterioration of the resulting oxygen-absorbing resin.

The resin according to the present invention which can be obtained by polymerizing raw materials including monomer (A) or (A') possesses quite high reactivity with oxygen and thus the resin can show actually acceptable oxygen-absorbing ability in the absence of any transition metal catalyst without having been exposed to any radiation. The rate of the alicyclic structure derived from monomer (A) or (A') in the oxygen-absorbing resin according to the present invention is preferably 0.4 to 10 meq/g. The rate is more preferably 0.5 to 8.0 meq/g, further more preferably 0.6 to 7.0 meq/g, and especially preferably 0.7 to 6.0 meq/g. If the rate is within the above ranges, the resulting oxygen-absorbing resin has a practically acceptable ability to absorb oxygen; the gelation of the resin during the polymerization and molding is prevented; and the resin does not show any significant hue change nor any significant strength reduction even after the absorption of oxygen.

The number average molecular weight of the oxygen-absorbing resin according to the present invention is preferably 1,000 to 1,000,000, and more preferably 20,000 to 200,000. If the number average molecular weight is within the above ranges, it is possible to form a film having an excellent processability and durability.

One of the oxygen-absorbing resins according to the present invention or any combination of at least two of them may be used.

The oxygen-absorbing resin according to the present invention can be used not only as starting resins for the melt processing such as the extrusion molding and the injection molding, but also as a paint after they are dissolved in a proper solvent. When using the oxygen-absorbing resin as a paint, a curing agent, such as an isocyanate type one may be incorporated into the resin to give a two-pack type adhesive for dry lamination.

The oxygen-absorbing resin according to the present invention possesses quite high reactivity with oxygen, and thus the resin can show actually acceptable oxygen-absorbing ability in the absence of any transition metal catalyst without having been exposed to any radiation. The reactivity of the oxygen-absorbing resin according to the present invention is initiated by heating the resin during the synthesis of resin and/or the molding process and the like. It is possible to increase the reactivity by aggressively providing the resin heat or inhibit the reaction by preventing the resin from being heated. For example, if the reaction is inhibited, it is possible to increase the reactivity by exposing the resin to radiation.

The radiation exposed to the oxygen-absorbing resin according to the present invention includes particle beams such as electron beams, proton beams and neutron beams, and electromagnetic waves such as γ-rays, X-rays, visible light rays and ultraviolet light rays. Among them, light rays such as visible light rays and ultraviolet light rays which are low energy radiation are particularly preferable, and ultraviolet light rays are more preferable. Conditions for the irradiation of the resin with ultraviolet rays are preferably, for example, as follows: UV-A, and an integral quantity of light ranging from 100 to 10000 mJ/cm$^2$. The best time for the irradiation of the resin with ultraviolet rays is not specifically restricted, but when using the resin as a material for an oxygen-absorbing container, the irradiation of the resin with ultraviolet rays is preferably carried out after the molding of the resin into a container and the charging of contents into the same, and immediately before the airtight sealing of the container, to make effective use of the oxygen-absorbing properties thereof.

The oxygen-absorbing resin of the present invention is preferably free of any allyl hydrogen atoms other than those present on the alicyclic structure. The allyl hydrogen atoms are relatively easily eliminated and thus quite susceptible to oxygen attack. If the resin has allyl hydrogen atoms on the linear chain structures other than the alicyclic structure, low molecular-weight decomposition products are easily formed through the molecular cleavage as the oxidation of the allyl-positions with oxygen proceeds.

The resin of the present invention may comprise alicyclic structures other than alicyclic structures which have high reactivity and are derived from monomer (A) or (A'). In addition, the above resin may comprise, in the other alicyclic structures, relatively low reactive allyl hydrogen atoms which are not included in the structures derived from monomer (A) or (A'). In the case of these resins having the foregoing other structures, the allyl hydrogen atoms present in the alicyclic structures having relatively low reactivity are activated due to the chain transfer of the radicals generated in the alicyclic structures which have high reactivity and are derived from monomer (A) or (A'), and thus this case is preferable since the oxygen-absorbing ability of the resin is often improved.

Further, another type of thermoplastic resin may be incorporated into the oxygen-absorbing resin of the present invention to thus form an oxygen-absorbing resin composition. As the thermoplastic resin, any type of thermoplastic resin may be used. The thermoplastic resin includes for example low-density polyethylene, medium-density polyethylene, high-density polyethylene, linear low-density polyethylene, linear very low-density polyethylene, polypropylene, poly-1-butene, poly-4-methyl-1-pentene, polyolefins such as random or block copolymers of α-olefins (such as ethylene, propylene, 1-butene and 4-methyl-1-pentene), cyclic olefin polymer (COP) and cyclic olefin copolymer (COC), acid-modified polyolefins such as maleic anhydride-grafted polyethylene and maleic anhydride-grafted polypropylene, ethylene-vinyl compound copolymers such as ethylene-vinyl acetate copolymer, ethylene-vinyl alcohol copolymer, ethylene-vinyl chloride copolymer, ethylene-(meth)acrylic acid copolymer, ionic crosslinked products thereof (ionomers) and ethylene-methyl methacrylate copolymer, styrenic resins such as polystyrene, acrylonitrile-styrene copolymer and α-methylstyrene-styrene copolymer, polyvinyl compounds such as poly(methyl acrylate) and poly(methyl methacrylate), polyamides such as nylon 6, nylon 66, nylon 610, nylon 12 and poly(m-xylylene adipamide) (MXD6), polyesters such as polyethylene terephthalate (PET), polybutylene terephthalate (PBT), poly(trimethylene terephthalate) (PTT), polyethylene naphthalate (PEN), glycol-modified polyethylene terephthalate (PETG), polyethylene succinate (PES), polybutylene succinate (PBS), poly(lactic acid), poly(glycolic acid), poly(caprolactone) and poly(hydroxy alkanoate), polycarbonates, polyethers such as polyethylene oxide, and mixtures thereof.

The thermoplastic resin is preferably polyethylene, and especially preferably low-density polyethylene. The linear low-density polyethylene which is a copolymer of ethylene and 1-alkene is more preferable. A film and sheet formed by blending the oxygen-absorbing resin and the linear low-density polyethylene have an excellent impact resistance. 1-propylene, 1-butene, 1-pentene, 1-hexene, 1-octene and mixtures thereof can be used as the 1-alkene. The amount of 1-alkene in the copolymer is preferably 2 to 30 wt %, and more preferably 2 to 20 wt %.

Regarding the polymerization of ethylene and 1-alkene, the resulting polymer may properly be selected from those prepared using the conventional Ziegler-Natta catalyst or those prepared using a single site catalyst so long as they possess the desired molecular structures, but the polymerization which is carried out through the use of a single-site catalyst would be able to prevent the compositional ratio for copolymerization from varying throughout all of the molecular weight components. As a result, the resulting copolymer has a uniform molecular structure and thus if the oxidation of the thermoplastic resin is induced by the chain transfer of the radicals of the oxygen-absorbing resin, the molecular chains constituting the copolymer are uniformly oxidized. Therefore, this polymerization carried out in such a way is preferable because the formation of any decomposition product due to molecular breakage can be inhibited. A preferable catalyst includes metallocene type ones. The other catalyst includes those for the polymerization of olefins which are recognized to be post-metallocene catalysts and, in particular, phenoxy-imine catalysts (FI Catalyst) are preferable.

It is preferred that the aforementioned linear low density polyethylene is for example copolymers of ethylene and 1-olefin prepared using a metallocene type catalyst as a polymerization catalyst, such as copolymers of ethylene and 1-butene, copolymers of ethylene and 1-hexene and copolymers of ethylene and 1-octene. One of these resins or any combination of at least two of them may be used.

The preparation of the foregoing resin through the polymerization using a single-site catalyst may be carried out using any industrially acceptable method, but it is preferably carried out according to the liquid phase technique since this technique has been most widely employed in this field.

One of the foregoing thermoplastic resins or any combination of at least two of them may be used.

The foregoing oxygen-absorbing resin may comprise a filler, a coloring agent, a heat stabilizer, a weathering agent, an antioxidant, an age resister, a light stabilizer, a UV absorber, an antistatic agent, a lubricating agent such as a metal soap or a wax, and/or an additive such as a modifier resin or rubber. However, if the foregoing oxygen-absorbing resin comprises an antioxidant, the addition amount thereof is preferably restricted to a small amount because the antioxidant may inhibit the oxygen absorption reaction of the oxygen-absorbing resin. The amount of the antioxidant in the oxygen-absorbing resin is preferably 100 ppm or less, more preferably 10 ppm or less and especially preferably 0 ppm.

The amount of the oxygen-absorbing resin of the oxygen-absorbing resin composition is preferably 3 to 80 wt %, more preferably 10 to 60 wt % and further more preferably 20 to 50 wt %. If the amount falls within the above ranges, the resulting oxygen-absorbing resin composition has a practically acceptable ability to absorb oxygen and the resin does not show any significant hue change or any significant strength reduction even after the absorption of oxygen.

The rate of the alicyclic structures present in the oxygen-absorbing resin is preferably 0.1 to 10 meq/g and more preferably 0.2 to 7 meq/g. If the rate falls within the above ranges, the resulting oxygen-absorbing resin composition has a practically acceptable ability to absorb oxygen and the resin does not show any significant hue change or any significant strength reduction even after the absorption of oxygen.

The oxygen-absorbing resin and the oxygen-absorbing resin composition according to the present invention may further comprise a plasticizer. The plasticizer defined herein includes all of those which are compatible with the oxygen-absorbing resin according to the present invention and have a property decreasing a glass transition temperature.

The plasticizer includes phthalate ester plasticizers, adipate ester plasticizers, azelaate ester plasticizers, sebacate ester plasticizers, phosphate ester plasticizers, trimellitate ester plasticizers, citrate ester plasticizers, epoxy ester plasticizers, polyester ester plasticizers and chlorinated paraffin plasticizers. Specifically, the plasticizer includes dimethyl phthalate, diethyl phthalate, dibutyl phthalate, di-2-ethylhexyl phthalate, tributyl acetylcitrate, methyl acetylricinoleate, di-2-ethylhexyl adipate, diisodecyl adipate, ethanediolmontanate, 1,3-butanediolmontanate, isobutyl stearate, poly(1,3-butylene glycol adipic acid)ester, poly(propylene glycol adipic acid-co-lauric acid)ester, poly(1,3-butylene glycol-co-1,4-butylene glycol adipic acid)ester terminated with octyl alcohol. The amount of the plasticizer in the oxygen-absorbing resin and the oxygen-absorbing resin composition is preferably 0.2 to 20 wt %, more preferably 0.5 to 10 wt %, and especially preferably 1 to 5 wt %.

The oxygen-absorbing resin and the oxygen-absorbing resin composition of the present invention may further comprise a variety of additives such as a radical polymerization initiator and a photosensitizer.

The radical polymerization initiator and photosensitizer include those currently known as photopolymerization initiators such as benzoins and their alkyl ethers such as benzoin, benzoin methyl ether, benzoin ethyl ether and benzoin propyl ether; acetophenones such as acetophenone, 2,2-dimethoxy-2-phenylacetophenone, 2,2-diethoxy-2-phenylacetophenone, 1,1-dichloroacetophenone, 1-hydroxycyclohexylphenylketone, 2-hydroxycyclohexylphenylketone and 2-methyl-1-[4-(methylthio)phenyl]-2-morpholino-propan-1-one; anthraquinones such as 2-methylanthraquinone and 2-amylanthraquinone; thioxanthones such as 2,4-dimethylthioxanthone, 2,4-diethylthioxanthone, 2-chlorothioxanthone and 2,4-diisopropylthioxanthone; ketals such as acetophenonedimethylketal and benzyldimethylketal; benzophenones such as benzophenone; and xanthones. Such photo- and radical-polymerization initiators may be used in combination with one or at least two conventionally known, and currently used photopolymerization accelerator such as benzoic acid initiators or tertiary amine initiators.

The other additives include fillers, coloring agents, heat stabilizers, weatherable stabilizers, antioxidants, age resistors, light stabilizers, ultraviolet light absorbers, antistatic agents, lubricants such as metallic soaps and waxes, modifier resins or rubber and these additives may be incorporated into the resin, or the resin composition according to any formulation known per se. For example, the blending a lubricant into the resin or the resin composition would improve the ability of a screw to bite the resin. The lubricants generally used herein are metallic soaps such as magnesium stearate and calcium stearate; those mainly comprising hydrocarbons such as liquid paraffin, naturally occurring and synthetic paraffin, microwaxes, polyethylene waxes and chlorinated polyethylene waxes; aliphatic acid lubricants such as stearic acid and lauric acid; aliphatic acid monoamide and bisamide lubricants such as stearic acid amide, palmitic acid amide, oleic acid amide, esilic acid amide, methylene bis-stearamide and ethylene bis-stearamide; ester lubricants such as butyl stearate, hardened castor oil and ethylene glycol, monostearate; and mixtures thereof. If the antioxidants is incorporated into the resin or the resin composition, as mentioned above, it is preferred that the incorporating amount of the antioxidants is restricted to the small amount.

The oxygen-absorbing resin and the oxygen-absorbing resin composition according to the present invention may be used for absorbing oxygen present in an airtightly sealed package, in the form of, for example, powder, granules or a sheet. Moreover, they may be incorporated into a resin or rubber for forming a liner, a gasket or a coating film in order to absorb the oxygen remaining in a package. In particular, the oxygen-absorbing resin and the oxygen-absorbing resin composition according to the present invention are preferably used as an oxygen-absorbing container made of a laminate which comprises at least one layer containing the resin or the resin composition and one or a plurality of layers of other resins.

The oxygen-absorbing container of the present invention comprises at least one layer (hereunder referred to as an "oxygen-absorbing layer") consisting of the foregoing oxygen-absorbing resin and oxygen-absorbing resin composition.

The materials for forming the layers other than the oxygen-absorbing layer, which constitute the oxygen-absorbing container of the present invention, may appropriately be selected from the group consisting of thermoplastic resins, thermosetting resins, and inorganic materials such as metals and paper while taking into consideration the modes of applications and required functions thereof. For example, the thermoplastic resins listed above in connection with the thermoplastic resins capable of being incorporated into the oxygen-absorbing resin according to the present invention, metal foils and inorganic vapor deposition films can be mentioned.

Regarding the oxygen-absorbing container of the present invention, an oxygen-barrier layer is preferably arranged at least on the outer side of the oxygen-absorbing layer for the further improvement of the effect of the oxygen-absorbing resin or the oxygen-absorbing resin composition. Such a construction of the container would allow the effective absorption of the external oxygen possibly penetrating into the container and the oxygen remaining in the container to thus control the oxygen concentration in the container to a considerably low level over a long period of time.

The oxygen-barrier layer may be prepared using a resin having oxygen-barrier characteristic properties (oxygen-barrier resin). Such an oxygen-barrier resin may be, for instance, ethylene-vinyl alcohol copolymers (EVOH). Also usable herein as an oxygen-barrier resin may be, for example, a saponified copolymer obtained by the saponification of an ethylene-vinyl acetate copolymer having an ethylene content ranging from 20 to 60 mole % and preferably 25 to 50 mole % to a degree of saponification of not less than 96 mole % and preferably not less than 99 mole %. Other examples of such oxygen-barrier resins are poly(m-xylyleneadipamide) (MXD6) and poly(glycolic acid). In addition, a nanocomposite material formed by incorporating an inorganic layered compound such as montmorillonite and the like into the above oxygen-barrier resin, the other polyamide resin and the like is preferably used.

In a case where the oxygen-absorbing container of the present invention is, in particular, a film container such as a pouch, usable as such an oxygen-barrier layer may be, for example, a foil of a light metal such as aluminum; a metal foil such as an iron foil, a tin plate foil, a surface-treated steel foil; a metal thin film or a metal oxide thin film formed on a substrate such as a biaxially oriented PET film by the evaporation method; or a diamond-like carbon thin film. It is also possible to use a barrier-coating film obtained by applying an oxygen-barrier coating layer onto a substrate film such as a biaxially oriented PET film.

A material constituting such metal thin films includes iron, aluminum, zinc, titanium, magnesium, tin, copper and silicon, with aluminum being particularly preferred.

A material constituting such metal oxide thin films includes silica, alumina, zirconium oxide, titanium oxide and magnesium oxide, with silica and alumina being particularly preferred. In this connection, one of these materials or any combination of at least two of them may be used and further a film of each material may be laminated with that of a material identical to or different from the former material.

The vapor deposition of such a thin film may be carried out according to any known method, for example, a physical vapor deposition technique (PVD technique) such as the vacuum deposition technique, the sputtering technique, the ion plating technique or the laser ablazion technique; or a chemical vapor deposition technique (CVD technique) such as the plasma chemical vapor deposition technique, the thermal chemical vapor deposition technique or the optical chemical vapor deposition technique.

A material constituting the oxygen-barrier coating includes resins having a high ability to form hydrogen bonds such as polyvinyl alcohol, ethylene-vinyl alcohol copolymers, poly(meth)acrylic acids, poly(allyl-amine), polyacrylamide and polysaccharides, vinylidene chloride resins, and epoxy-amines. In addition, it is also preferred to incorporate an inorganic compound having a lamellar structure such as montmorillonite into these materials.

Moreover, containers having an oxygen-absorbing barrier layer which comprises the foregoing oxygen-barrier resin containing the oxygen-absorbing resin and the oxygen-absorbing resin composition incorporated into the same are preferred as the oxygen-absorbing container of the present invention. In this case, a separate oxygen barrier layer and a separate oxygen-absorbing layer are not necessarily used, and therefore this would permit the simplification of the layer structure of the oxygen-absorbing container.

The oxygen-absorbing container may be produced by any molding method known per se.

For example, extrusion molding operations can be carried out using a number of extruders corresponding to the kinds of the resins used and a multilayered and multiple die to thus form a multi-layer film, a multi-layer sheet, a multi-layer parison or a multi-layer pipe. Alternatively, a multi-layer preform for molding bottles may be prepared according to a co-injection molding technique such as the simultaneous injection method or the sequential injection method using a number of extruders corresponding to the kinds of the resins used. Such a multi-layer film, parison or preform can be further processed to thus form an oxygen-absorbing multilayered container.

The packaging material such as a film may be used as pouches having a variety of shapes, and a capping material for trays and cups. Examples of such pouches include three sided seal or four sided seal flat pouches, gusseted pouches, standing pouches and pillow-shaped packaging bags. These bags may be prepared by any known bag-manufacturing method. Moreover, a film or a sheet can be subjected to a molding means such as the vacuum forming technique, the pressure forming technique, the stretch forming technique and the plug-assist forming technique to thus obtain a packaging container having a cup-like or tray-like shape.

A multi-layer film or a multi-layer sheet may be prepared using, for instance, the extrusion coating technique or the sandwich-lamination technique. In addition, single-layer and multi-layer films, which have been formed in advance, can be laminated together by the dry-lamination technique. Such methods specifically include, for example, a method in which a transparent vapor deposited film can be laminated with a co-extruded film having a three-layer structure—a thermoplastic resin layer/an oxygen-absorbing layer/a thermoplastic resin (sealant) layer—through the dry-lamination technique; a method in which two layers—an oxygen-absorbing layer/a sealant layer—can be extrusion-coated, through an anchoring agent, with a two-layer film comprising biaxially oriented PET film/aluminum foil laminated together by the dry-lamination technique; or a method in which a polyethylene single-layer film is sandwich-laminated, through a polyethylene-based oxygen-absorbing resin composition, with a two-layer film comprising barrier coating film/polyethylene film which are laminated by the dry-lamination technique, but the present invention is not restricted to these specific methods at all.

Furthermore, a bottle or a tube may easily be formed by pinching off a parison, a pipe or a preform by using a pair of split molds and then blowing a fluid through the interior thereof. Moreover, a pipe or a preform is cooled, then heated to an orientation temperature and oriented in the axial direction while blow-orientating the same in the circumferential direction by the action of a fluid pressure to thus form a stretch blow-molded bottle.

The oxygen-absorbing container of the present invention can effectively inhibit any penetration of external oxygen into the container through the wall thereof and can absorb the oxygen remaining in the container. For this reason, the container is quite useful since it permits the maintenance of the internal oxygen concentration at a quite low level over a long period of time, the prevention of any quality deterioration of the content thereof due to the action of oxygen present, therein and the prolonging of the shelf life of the content.

The oxygen-absorbing resin or composition of the present invention can thus be used for the packaging of contents quite susceptible to deterioration in the presence of oxygen, in particular, foods such as coffee beans, tea leaves (green tea), snacks, baked confectionery prepared from rice, Japanese unbaked and semi-baked cakes, fruits, nuts, vegetables, fish and meat products, pasted products, dried fish and meat, smoked fish and meat, foods boiled in soy sauce, uncooked and cooked rice products, infant foods, jam, mayonnaise, ketchup, edible fats and oils, dressings, sauces and dairy products; beverages such as beer, wine, fruit juices, green tea, and coffee; and other products such as pharmaceutical preparations, cosmetic products and electronic parts, but the present invention is not restricted to these specific ones at all.

EXAMPLES

The present invention will hereunder be described in more detail with reference to the following Examples. In the following Examples, each numerical value was determined according to the method specified below:

(1) Number Average Molecular Weight (Mn) and Molecular Weight Distribution (Mw/Mn)

This was determined by the gel permeation chromatography (GPC) technique (HLC-8120 Model GPC available from Tosoh Corporation) and expressed in terms of the value relative to that of the polystyrene. In this case, chloroform was used as the solvent.

(2) Relative Proportions of the Monomer Units in the Copolyester Resin

Using a nuclear magnetic resonance spectroscopy ($^1$H-NMR, EX270 available from JEOL DATUM LTD.), relative proportions of the acid components contained in the resin were calculated. The relative proportions of the acid components were calculated from area ratio of signals of proton of benzene ring from terephthalic acid (8.1 ppm), proton of benzene ring from isophthalic acid (8.7 ppm), methylene proton adjacent to ester groups from terephthalic acid and isophthalic acid (4.3-4.4 ppm), methylene proton adjacent to ester groups from methyltetrahydrophthalic anhydride, succinic acid and adipic acid (4.1-4.2 ppm), methylene proton from succinic acid (2.6 ppm) and methylene proton from adipic acid (2.3 ppm). The solvent used herein was deuterochloroform containing tetramethylsilane as a reference material.

In this connection, it was confirmed that the relative proportions in the copolyester resins were substantially identical to the amounts (mole ratio) of monomers used in the polymerization.

(3) Glass Transition Point (Tg)

This was determined in a nitrogen gas stream at a rate of temperature rise of 10° C./min using a differential scanning calorimeter (DSC6220 available from Seiko Instruments Inc.).

(4) Handling Ability

The presence of blocking by resin sticking to a hopper was evaluated as follows. The resin was cut into about 5 mm dice and the resulting dice was placed in a vacuum, drier at 50° C. for about 8 hours to crystallize it. If a blocking of the resulting crystallized pellet occurred in a hopper of an extruder, said evaluation was x; if a blocking of the resulting crystallized pellet did not occur in a hopper of an extruder, said evaluation was ○; and if a blocking of the resulting crystallized pellet occurred slightly in a hopper of an extruder, said evaluation was Δ.

(5) Amount of Oxygen Absorbed

A specimen cut out was introduced into an oxygen-impermeable steel foil-laminated cup having an inner volume of 85 $cm^3$, then the cup was heat sealed with an aluminum foil-laminated film cap and stored within an atmosphere maintained at 22° C. After storage of the cup for a predetermined time period, the oxygen gas concentration within the cup was determined by a micro-gas chromatograph (M-200 available from Agirent Technology Co., Ltd.) to thus calculate the amount of oxygen absorbed per 1 $cm^2$ of the resin.

(6) Amount of Volatile Decomposition Products

A specimen cut out was encapsulated in a vial for headspace gas chromatography having an inner volume of 22 $cm^3$, and then the vial was stored within an atmosphere maintained at 22° C. After storage of the vial for a predetermined time period, the amount of volatile decomposition products within the vial was determined by a gas chromatography equipment (6890 series available from Agirent Technology Co., Ltd., column HP-5) equipped with headspace sampler (HP7694 available from Hewlett Packard Co.) to thus calculate the amount of volatile decomposition products per 1 ml of the absorbed oxygen.

Example 1

To a 300 ml volume separable flask equipped with a stirring machine, a nitrogen gas-introduction tube and a Dean-Stark type water separator, were added 66.5 g of methyl tetrahydrophthalic anhydride (available from Hitachi Chemical Co., Ltd.; HN-2200) containing about 45% by mass of 4-methyl-$\Delta^3$-tetrahydrophthalic anhydride as monomer (A), 99.7 g of terephthalic acid (available from Wako Pure Chemical Industries, Ltd.) as monomer (B), 180.2 g of 1,4-butanediol (available from Wako Pure Chemical Industries, Ltd.) as monomer (C), 0.103 g of isopropyl titanate (available from Kishida Chemical Co., Ltd.) and 20 ml of toluene, and the reaction of these components was continued at a temperature ranging from 150 to 200° C. in a nitrogen gas atmosphere over about 6 hours, while removing the water generated. Subsequently, the toluene was removed from the reaction system, and finally the polymerization was carried out under a reduced pressure of 0.1 kPa at 200° C. for about 6 hours to obtain rubber-like polyester E having 11.9° C. of Tg. Mn and Mw/Mn of polyester E were about 8,600 and 6.5, respectively.

The resulting polyester E was formed into a sheet having an average thickness of about 270 μm using a hot press maintained at 200° C., and then a specimen of 20 $cm^2$ was cut off from the sheet and used for the evaluation of the amount of absorbed oxygen. The results thus obtained are summarized in Table 1.

Example 2

The same polymerization as that of Example 1 was repeated, except that the following composition of monomers was used, to obtain rubber-like polyester F having 10.0° C. of Tg.

monomer (A): HN-2200 83.1;

monomer (B): TPA 83.1 g; and monomer (C): BG 180.2 g.

Mn and Mw/Mn of the resulting polyester F were about 8,800 and 9.3, respectively.

The resulting polyester F was used for the evaluation of the amount of absorbed oxygen using the same way as that of Example 1. The results thus obtained are summarized in Table 1.

Example 3

The same polymerization as that of Example 1 was repeated, except that the following composition of monomers was used, to obtain rubber-like polyester G having 9.3° C. of Tg.

monomer (A): HN-2200 99.7 g;

monomer (B): TPA 66.5 g; and monomer (C): BG 180.2 g.

Mn and Mw/Mn of the resulting polyester G were about 6,000 and 7.7, respectively.

The resulting polyester G was used for the evaluation of the amount of absorbed oxygen using the same way as that of Example 1. The results thus obtained are summarized in Table 1.

Example 4

The same polymerization as that of Example 1 was repeated, except that the following composition of monomers was used, to obtain rubber-like polyester H having 10.4° C. of Tg, monomer (A): HN-2200 83.1 g;

monomer (B): TPA 74.8 g and isophthalic acid (available from Wako Pure Chemical Industries, Ltd.; IPA) 8.3 g; and monomer (C): BG 180.2 g.

Mn and Mw/Mn of the resulting polyester H were about 8,200 and 9.5, respectively.

The resulting polyester H was used for the evaluation of the amount of absorbed oxygen using the same way as that of Example 1. The results thus obtained are summarized in Table 1.

Example 5

The same polymerization as that, of Example 1 was repeated, except that the following composition of monomers was used, to obtain rubber-like polyester I having 9.9° C. of Tg.

monomer (A): HN-2200 83.1 g;

monomer (B): TPA 66.5 g and isophthalic acid (available from Wako Pure Chemical Industries, Ltd.; IPA) 16.6 g; and monomer (C): BG 180.2 g.

Mn and Mw/Mn of the resulting polyester I were about 7,900 and 10.3, respectively.

The resulting polyester I was used for the evaluation of the amount of absorbed oxygen using the same way as that of Example 1. The results thus obtained are summarized in Table 1.

Example 6

The same polymerization as that of Example 1 was repeated, except that the following composition of monomers was used, to obtain, rubber-like polyester J having 13.0° C. of Tg.

monomer (A): HN-2200 83.1 g;

monomer (B): TPA 83.1 g; and monomer (C): BG 126.2 g and ethylene glycol (available from Kishida Chemical Co., Ltd.; EG) 37.2 g.

Mn and Mw/Mn of the resulting polyester J were about 6,400 and 7.5, respectively.

The resulting polyester J was used for the evaluation of the amount of absorbed oxygen using the same way as that of Example 1. The results thus obtained are summarized in Table 1.

Example 7

The same polymerization as that of Example 1 was repeated, except that the following composition of monomers was used, to obtain rubber-like polyester K having 7.0° C. of Tg.

monomer (A): HN-2200 83.1 g;

monomer (B): TPA 83.1 g; and monomer (C): BG 162.2 g and 1,6-hexanediol (available from Wako Pure Chemical Industries, Ltd.; HG) 23.6 g.

Mn and Mw/Mn of the resulting polyester K were about 7,800 and 8.9, respectively.

The resulting polyester K was used for the evaluation of the amount of absorbed oxygen using the same way as that of Example 1. The results thus obtained are summarized in Table 1.

Example 8

The same polymerization as that of Example 1 was repeated, except that the following composition of monomers was used, to obtain rubber-like polyester L having 4.1° C. of Tg.

monomer (A): HN-2200 83.1 g;

monomer (B): TPA 83.1 g; and monomer (C): BG 144.2 g and HG 47.3 g.

Mn and Mw/Mn of the resulting polyester K were about 7,800 and 8.9, respectively.

The resulting polyester K was used for the evaluation of the amount of absorbed oxygen using the same way as that of Example 1. The results thus obtained are summarized in Table 1.

Example 9

The same polymerization as that of Example 1 was repeated, except that the following composition of monomers was used, to obtain rubber-like polyester M having 6.6° C. of Tg.

monomer (A): HN-2200 83.1 g;

monomer (B): TPA 74.8 g;

monomer (C): BG 180.2 g; and monomer (D): succinic acid (available from Wako Pure Chemical Industries, Ltd.; SA) 5.9 g.

Mn and Mw/Mn of the resulting polyester M were about 7,700 and 13.2, respectively.

The resulting polyester M was used for the evaluation of the amount of absorbed oxygen using the same way as that of Example 1. The results thus obtained are summarized in Table 1.

Example 10

The same polymerization as that of Example 1 was repeated, except that the following composition of monomers was used, to obtain rubber-like polyester N having 2.7° C. of Tg.

monomer (A): HN-2200 83.1 g;

monomer (B): TPA 66.5 g;

monomer (C): BG 180.2 g; and monomer (D): SA 11.8 g.

Mn and Mw/Mn of the resulting polyester N were about 8,000 and 13.3, respectively.

The resulting polyester N was used for the evaluation of the amount of absorbed oxygen using the same way as that of Example 1. The results thus obtained are summarized in Table 1.

Example 11

The same polymerization as that of Example 1 was repeated, except that the following composition of monomers was used, to obtain rubber-like polyester O having 3.3° C. of Tg.

monomer (A): HN-2200 83.1 g;

monomer (B): TPA 74.8 g;

monomer (C): BG 180.2 g; and monomer (D): adipic acid (available from Wako Pure Chemical Industries, Ltd.; AA) 7.3 g.

Mn and Mw/Mn of the resulting polyester O were about 7,300 and 8.9, respectively.

The resulting polyester O was used for the evaluation of the amount of absorbed oxygen using the same way as that of Example 1. The results thus obtained are summarized in Table 1.

Example 12

The same polymerization as that of Example 1 was repeated, except that the following composition of monomers was used, to obtain rubber-like polyester P having 2.0° C. of Tg.

monomer (A): HN-2200 83.1 g;

monomer (B): TPA 70.6 g;

monomer (C): BG 180.2 g; and monomer (D): AA 11.0 g.

Mn and Mw/Mn of the resulting polyester P were about 7,300 and 13.6, respectively.

The resulting polyester P was used for the evaluation of the amount of absorbed oxygen using the same way as that of Example 1. The results thus obtained are summarized in Table 1.

Example 13

The same polymerization as that of Example 1 was repeated, except that the following composition of monomers was used, to obtain rubber-like polyester Q having −0.3° C. of Tg.

monomer (A): HN-2200 83.1 g;

monomer (B): TPA 66.5 g;

monomer (C): BG 180.2 g; and monomer (D): AA 14.6 g.

Mn and Mw/Mn of the resulting polyester Q were about 7,500 and 13.5, respectively.

The resulting polyester Q was used for the evaluation of the amount of absorbed oxygen using the same way as that of Example 1, The results thus obtained are summarized in Table 1.

Example 14

The same polymerization as that of Example 1 was repeated, except that the following composition of monomers was used, to obtain rubber-like polyester R having −6.1° C. of Tg.

monomer (A): HN-2200 83.1 g;

monomer (B): TPA 58.1 g;

monomer (C): BG 180.2 g; and monomer (D): AA 21.9 g.

Mn and Mw/Mn of the resulting polyester R were about 6,800 and 10.2, respectively.

The resulting polyester R was used for the evaluation of the amount of absorbed oxygen using the same way as that of Example 1. The results thus obtained are summarized in Table 1.

Example 15

The same polymerization as that of Example 1 was repeated, except that the following composition of monomers was used, to obtain rubber-like polyester S having 2.9° C. of Tg.

monomer (A): HN-2200 83.1 g;

monomer (B): TPA 74.8 g;

monomer (C): BG 171.2 g and HG 11.8 g; and monomer (D): AA 7.3 g.

Mn and Mw/Mn of the resulting polyester S were about 7,300 and 11.7, respectively.

The resulting polyester S was used for the evaluation of the amount of absorbed oxygen using the same way as that of Example 1. The results thus obtained are summarized in Table 1.

Example 16

The same polymerization as that of Example 1 was repeated, except that the following composition of monomers was used, to obtain rubber-like polyester T having 1.6° C. of Tg.

monomer (A): HN-2200 83.1 g;

monomer (B): TPA 74.8 g;

monomer (C): BG 162.2 g and HG 23.6 g; and monomer (D): AA 7.3 g.

Mn and Mw/Mn of the resulting polyester T were about 8,000 and 10.4, respectively.

The resulting polyester T was used for the evaluation of the amount of absorbed oxygen using the same way as that of Example 1. The results thus obtained are summarized in Table 1.

Example 17

The same polymerization as that of Example 1 was repeated, except that the following composition of monomers was used, to obtain rubber-like polyester U having −1.9° C. of Tg.

monomer (A): HN-2200 83.1 g;

monomer (B): TPA 66.5 g;

monomer (C): BG 171.2 g and HG 11.8 g; and monomer (D): AA 14.6 g.

Mn and Mw/Mn of the resulting polyester U were about 8,100 and 12.6, respectively.

The resulting polyester U was used for the evaluation of the amount of absorbed oxygen using the same way as that of Example 1. The results thus obtained are summarized in Table 1.

Example 18

The same polymerization as that of Example 1 was repeated, except that the following composition of monomers was used, to obtain rubber-like polyester V having −2.3° C. of Tg.

monomer (A): HN-2200 83.1 g;

monomer (B): TPA 66.5 g;

monomer (C): BG 162.2 g and HG 23.6 g; and monomer (D): AA 14.6 g.

Mn and Mw/Mn of the resulting polyester V were about 8,000 and 15.1, respectively.

The resulting polyester V was used for the evaluation of the amount of absorbed oxygen using the same way as that of Example 1. The results thus obtained are summarized in Table 1.

Comparative Example 1

The same polymerization as that of Example 1 was repeated, except that the following composition of monomers was used, to obtain rubber-like polyester W having 2.0° C. of Tg.

monomer (A): HN-2200 166.2 g; and monomer (C): BG 180.2 g.

Mn of the resulting polyester W was about 5,200 while Mw/Mn of polyester W was 27 which are very large. In addition, the resin contained a small amount of gel.

Although the resulting polyester W was treated in a vacuum dryer at 50° C. for about 8 hours, the appearance thereof was not especially changed and also the polyester W was not crystallized. In addition, polyester W has a sticky surface and thus has a poor handling ability because of a tendency to block. Although polyester W was tried to form a sheet using a hot press, it could not be done.

Comparative Example 2

The same polymerization as that of Example 1 was repeated, except that the following composition of monomers was used, to obtain rubber-like polyester X having −22.3° C. of Tg.

monomer (A): HN-2200 83.1 g;

monomer (C): BG 180.2 g; and monomer (D): SA 59.1 g.

Mn and Mw/Mn of the resulting polyester X were about 4,800 and 10.1, respectively.

The resulting polyester X was used for the evaluation of the amount of absorbed oxygen using the same way as that of Example 1. The results thus obtained are summarized in Table 1.

Comparative Example 3

The same polymerization as that of Example 1 was repeated, except that the following composition of monomers was used, to obtain rubber-like polyester Y having −35.5° C. of Tg.

monomer (A): HN-2200 83.1 g;

monomer (C): BG 180.2 g; and monomer (D): AA 73.1 g.

Mn and Mw/Mn of the resulting polyester Y were about 5,300 and 34.8, respectively.

The resulting polyester Y was used for the evaluation of the amount of absorbed oxygen using the same way as that of Example 1. The results thus obtained are summarized in Table 1.

TABLE 1

| Example | Oxygen-absorbing resin | A | B TPA | B IPA | C EG | C BG | C HG | C CHDM | D AA | D SA |
|---|---|---|---|---|---|---|---|---|---|---|
| 1 | E | 18 | 60 | — | — | 100 | — | — | — | — |
| 2 | F | 23 | 50 | — | — | 100 | — | — | — | — |
| 3 | G | 27 | 40 | — | — | — | — | — | — | — |
| 4 | H | 23 | 45 | 5 | — | 100 | — | — | — | — |
| 5 | I | 23 | 40 | 10 | — | 100 | — | — | — | — |
| 6 | J | 23 | 50 | — | 30 | 70 | — | — | — | — |
| 7 | K | 23 | 50 | — | — | 90 | 10 | — | — | — |
| 8 | L | 23 | 50 | — | — | 80 | 20 | — | — | — |
| 9 | M | 23 | 45 | — | — | 100 | — | — | — | 5 |
| 10 | N | 23 | 40 | — | — | 100 | — | — | — | 10 |
| 11 | O | 23 | 45 | — | — | 100 | — | — | 5 | — |
| 12 | P | 23 | 42.5 | — | — | 100 | — | — | 7.5 | — |
| 13 | Q | 23 | 40 | — | — | 100 | — | — | 10 | — |
| 14 | R | 23 | 35 | — | — | 100 | — | — | 15 | — |
| 15 | S | 23 | 45 | — | — | 95 | 5 | — | 5 | — |
| 16 | T | 23 | 45 | — | — | 90 | 10 | — | 5 | — |
| 17 | U | 23 | 40 | — | — | 95 | 5 | — | 10 | — |
| 18 | V | 23 | 40 | — | — | 90 | 10 | — | 10 | — |
| *1 | W | 45 | — | — | — | — | 100 | — | — | — |
| *2 | X | 23 | — | — | — | 100 | — | — | — | 50 |
| *3 | Y | 23 | — | — | — | 100 | — | — | 50 | — |

| | Tg (° C.) | Handling ability | Amount of oxygen Absorbed (ml/cm²) After 3 days | Amount of oxygen Absorbed (ml/cm²) After 14 days | Overall judgment |
|---|---|---|---|---|---|
| 1 | 11.9 | ○ | 0.031 | 0.116 | ○ |
| 2 | 10.0 | ○ | 0.052 | 0.176 | ○ |
| 3 | 9.3 | ○ | 0.061 | 0.190 | ○ |
| 4 | 10.4 | ○ | 0.055 | 0.228 | ○ |
| 5 | 9.9 | ○ | 0.054 | 0.223 | ○ |
| 6 | 13.0 | ○ | 0.036 | 0.139 | ○ |
| 7 | 7.0 | ○ | 0.075 | 0.200 | ○ |
| 8 | 4.1 | Δ | 0.087 | 0.280 | ○ |
| 9 | 6.6 | ○ | 0.070 | 0.208 | ○ |
| 10 | 2.7 | Δ | 0.082 | 0.230 | ○ |
| 11 | 3.3 | ○ | 0.065 | 0.214 | ○ |
| 12 | 2.0 | ○ | 0.100 | 0.254 | ◎ |

TABLE 1-continued

| | | | | | |
|---|---|---|---|---|---|
| 13 | −0.3 | Δ | 0.090 | 0.271 | ○ |
| 14 | −6.1 | Δ | 0.045 | 0.312 | ○ |
| 15 | 2.9 | ○ | 0.083 | 0.232 | ○ |
| 16 | 1.6 | ○ | 0.088 | 0.253 | ○ |
| 17 | −1.9 | Δ | 0.090 | 0.279 | ○ |
| 18 | −2.3 | Δ | 0.077 | 0.281 | ○ |
| *1 | 2.0 | X | A sheet could not be formed. | A sheet could not be formed. | X |
| *2 | −22.3 | X | 0.001 | 0.087 | X |
| *3 | −35.5 | X | 0.005 | 0.326 | X |

*Comparative Example

Example 19

Oxygen-absorbing resin F (50 parts by mass) and metallocene-catalyzed linear low-density polyethylene (m-LLDPE, EVOLUE SP0511 available from Prime Polymer Co., Ltd., 50 parts by mass) as a thermoplastic resin were melt-blended, in a laboratory mixing extruder (CS-194AV available from Toyo Seiki Co., Ltd.) at a temperature of 200° C. to obtain resin composition 1.

The resulting resin composition 1 was formed into a sheet having an average thickness of about 270 μm using a hot press maintained at 200° C., and specimens of 20 cm² and 5 cm² were cut off from the sheet and used for the evaluations of the amount of absorbed oxygen and volatile decomposition products. The results thus obtained are summarized in Table 2.

Example 20

The same process as that of Example 19 was repeated, except that oxygen-absorbing resin F (50 parts by mass) and low-density polyethylene (LDPE, Sumikathene L-705 available from Sumitomo Chemical Co., Ltd., 50 parts by mass) as a thermoplastic resin were used, to obtain resin composition 2.

The resulting resin composition 2 was used for the evaluation using the same way as that of Example 19. The results thus obtained are summarized in Table 2.

Example 21

The same process as that of Example 19 was repeated, except that oxygen-absorbing resin H (50 parts by mass) and m-LLDPE (EVOLUE SP0511, 50 parts by mass) as a thermoplastic resin were used, to obtain resin composition 3.

The resulting resin composition 3 was used for the evaluation using the same way as that of Example 19. The results thus obtained are summarized in Table 2.

Example 22

The same process as that of Example 19 was repeated, except, that oxygen-absorbing resin H (50 parts by mass) and LDPE (Sumikathene L-705, 50 parts by mass) as a thermoplastic resin were used, to obtain resin composition 4.

The resulting resin composition 4 was used for the evaluation using the same way as that of Example 19. The results thus obtained are summarized in Table 2.

Example 23

The same process as that of Example 19 was repeated, except that oxygen-absorbing resin H (50 parts by mass) and polybutylene terephthalate copolymer (PBT, DURANEX 600LP available from Polyplastics Co., Ltd., 50 parts by mass) as a thermoplastic resin were used, to obtain resin composition 5.

The resulting resin composition 5 was used for the evaluation using the same way as that of Example 19. The results thus obtained are summarized in Table 2.

Example 24

The same process as that of Example 19 was repeated, except that oxygen-absorbing resin H (50 parts by mass) and polybutylene succinate (PBS, GS-pla AZ91T available from Mitsubishi Chemical Corporation, 50 parts by mass) as a thermoplastic resin were used, to obtain resin composition 6.

The resulting resin composition 6 was used for the evaluation using the same way as that of Example 19. The results thus obtained are summarized in Table 2.

Example 25

The same process as that of Example 19 was repeated, except that oxygen-absorbing resin F (50 parts by mass) and metallocene-catalyzed linear low-density polyethylene (m-LLDPE, UMERIT 140HK available from UBE-MARUZEN POLYETHYLENE Co., Ltd., 50 parts by mass) as a thermoplastic resin were used, to obtain resin composition 7.

The resulting resin composition 7 was formed into a film having an average thickness of about 60 μm using a hot press maintained at 200° C., and specimen of 20 cm² was cut off from the film and used for the evaluation of the amount of absorbed oxygen. The results thus obtained are summarized in Table 2.

Example 26

The same process as that of Example 19 was repeated, except that oxygen-absorbing resin F (50 parts by mass) and metallocene-catalyzed low-density polyethylene (m-LDPE, EXCELLEN GMH CB5002 available from SUMITOMO CHEMICAL Co., Ltd., 50 parts by mass) as a thermoplastic resin were used, to obtain resin composition 8.

The resulting resin composition 8 was used for the evaluation using the same way as that of Example 25. The results thus obtained are summarized, in Table 2.

Example 27

The same process as that of Example 19 was repeated, except that oxygen-absorbing resin P (50 parts by mass) and m-LLDPE (UMERIT 140HK, 50 parts by mass) as a thermoplastic resin were used, to obtain resin composition 9.

The resulting resin composition 9 was used for the evaluation using the same way as that of Example 25. The results thus obtained are summarized in Table 2.

Example 28

The same process as that of Example 19 was repeated, except that oxygen-absorbing resin P (30 parts by mass) and m-LLDPE (UMERIT 140HK, 70 parts by mass) as a thermoplastic resin were used, to obtain resin composition 10.

The resulting resin composition 10 was used for the evaluation using the same way as that of Example 25, The results thus obtained are summarized in Table 2.

Example 29

Oxygen-absorbing resin F (50 parts by mass), low-density polyethylene (LDPE, L-719 available from UBE-MARUZEN POLYETHYLENE Co., Ltd., 50 parts by mass) as a thermoplastic resin and acetyl tributyl citrate (ATBC, available from ASAHI KASEI FINECHEM CO., LTD., 2.5 parts by mass) as a plasticizer were melt-blended, in a laboratory mixing extruder at a temperature of 200° C. to obtain resin composition 11. Resin composition 11 had 4.6° C. of Tg from the oxygen-absorbing resin.

The resulting resin composition 11 was used for the evaluation using the same way as that of Example 25. The results thus obtained are summarized in Table 2.

TABLE 2

| Example | Oxygen-absorbing resin | Thermoplastic resin | Plasticizer | Amount of Oxygen-absorbing resin (wt %) | Thickness (μm) |
|---|---|---|---|---|---|
| 19 | F | m-LLDPE | — | 50 | 270 |
| 20 | F | LDPE | — | 50 | 270 |
| 21 | H | m-LLDPE | — | 50 | 270 |
| 22 | H | LDPE | — | 50 | 270 |
| 23 | H | PBT | — | 50 | 270 |
| 24 | H | PBS | — | 50 | 270 |
| 25 | F | m-LLDPE | — | 50 | 60 |
| 26 | F | m-LDPE | — | 50 | 60 |
| 27 | P | m-LLDPE | — | 50 | 60 |
| 28 | P | m-LLDPE | — | 30 | 60 |
| 29 | F | LDPE | ATBC | 49 | 60 |

| Example | Amount of oxygen Absorbed (ml/cm²) After 3 days | After 7 days | After 14 days | Amount of volatile decomposition products (pA * s/ml/14 days) | Overall judgment |
|---|---|---|---|---|---|
| 19 | — | — | 0.208 | 120.8 | ◎ |
| 20 | — | — | 0.203 | 203.5 | ○ |
| 21 | — | — | 0.216 | 92.4 | ◎ |
| 22 | — | — | 0.219 | 231.2 | ○ |
| 23 | — | — | 0.064 | 542 | ○ |
| 24 | — | — | 0.076 | 252.3 | ○ |
| 25 | 0.022 | 0.054 | 0.076 | — | ○ |
| 26 | 0.012 | 0.036 | 0.062 | — | ○ |
| 27 | 0.070 | 0.119 | 0.151 | — | ◎ |
| 28 | 0.037 | 0.074 | 0.098 | — | ○ |
| 29 | 0.065 | 0.120 | 0.161 | — | ◎ |

Example 30

1 kg of resin F was prepared and then dried under vacuum of 0.1 kPa or less at 50° C. for 8 hours to crystallize it. The resulting crystals (50 parts by mass) were ground and then T die method was applied to the ground product by using LABO PLASTOMILL (Toyo Seiki Seisaku-sho, LTD.) at a forming temperature of 200° C. to form a film. Finally, a three-layer coextrusion film (EMAA (15 μm)/resin F (60 μm)/EMAA (15 μm), thickness is shown in parentheses.) of said film and an ethylene methacrylic acid resin (EMSS, Nucrel N1035 available from DU PONT-MITSUI POLYCHEMICALS) was obtained.

In addition, A 12 μm thick transparent, vapor deposited, biaxially oriented polyethylene terephthalate (PET) film (GL-AEH available from Toppan Printing Co., Ltd.) was adhered to a 30 μm thick LDPE film (V-1 available from Tama Poly Company) which was previously corona-treated on one side using a two-pack type urethane adhesive (TAKELACK A-315+TAKENATE A-50 available from Takeda Chemical Industries, Ltd.) in such a manner that the vapor-deposited surface of the vapor-deposited film faced the corona-discharged surface of the LDPE film and then the adhesive was cured at 50° C. for 3 days to thus prepare a two-layer film of transparent vapor-deposited PET/LDPE. The above three-layer coextrusion film was thermally laminated with the resulting two-layer film on the LDPE side of the resulting two-layer film to form an oxygen absorbing laminate film.

The resulting laminate films were put on top of each other so that the three-layer coextrusion films were opposed to one another and the 4 sides thereof were heat-sealed to obtain a transparent flat pouch having an effective area of 80 cm² and an inner volume of 15 ml. This flat pouch was stored at 22° C. and then the oxygen concentration within the pouch was monitored using a micro-gas chromatograph (M200 available from Agilent Technologies, Inc.). The results thus obtained are listed in the Table 3.

Example 31

1 kg of resin F was prepared and then dried under vacuum of 0.1 kPa or less at 50° C. for 8 hours to crystallize it. The resulting crystals (50 parts by mass) were ground, and then the resulting ground product and m-LLDPE (UMERIT 140HK, 50 parts by mass) as a thermoplastic resin were melt-blended at a blade rotational number of 100 rpm and a forming temperature of 200° C. while being evacuated to a high vacuum through a vent using a twin-screw extruder (TEM-35B available from Toshiba Machine Co., Ltd.) equipped with a strand die at the outlet portion thereof to obtain resin composition 12. This resin composition had a high melt viscosity and thus an excellent extrusion moldability.

In addition, T die method was applied to the resin composition 12 by using LABO PLASTOMILL (Toyo Seiki Seisaku-sho, LTD.) at a forming temperature of 200° C. to form a film, and finally a three-layer coextrusion film (m-LLDPE (15 μm)/resin composition 12 (60 μm)/m-LLDPE (15 μm), thickness is shown in parentheses.) of said film and m-LLDPE was obtained.

Like in Example 30, the two-layer film of transparent vapor-deposited PET/LDPE was laminated with the resulting coextrusion film to form a flat pouch and then the oxygen concentration within the pouch was monitored. The results thus obtained are listed in the Table 3.

Example 32

Like in Example 31, a flat pouch was formed and then the oxygen concentration within the pouch was monitored except that 1 kg of resin H instead of resin F was prepared. The results thus obtained are listed in the Table 3.

Example 33

Like Example 31, a flat pouch was formed and then the oxygen concentration within the pouch was monitored except that 1 kg of resin P instead of resin F was prepared. The results thus obtained are listed in the Table 3.

Example 34

1 kg of resin F was prepared and then dried under vacuum of 0.1 kPa or less at 50° C. for 8 hours to crystallize it. The resulting crystals (50 parts by mass) were ground, and then the resulting ground product, LDPE (L719, 50 parts by mass) as a thermoplastic resin and ATBC (2 parts by mass) as a plasticizer were melt-blended at a blade rotational number of 100 rpm and a forming temperature of 200° C. while being evacuated to a high vacuum through a vent using a twin-screw extruder (TEM-35B available from Toshiba Machine Co., Ltd.) equipped with a strand die at the outlet portion thereof to obtain resin composition 13. This resin composition had a high melt viscosity and thus an excellent extrusion moldability.

In addition, T die method was applied to the resin composition 13 by using LABO PLASTOMILL at a forming temperature of 200° C. to form a film, and finally a three-layer coextrusion film (LDPE (15 μm)/resin composition 13 (60 μm)/LDPE (15 μm), thickness is shown in parentheses.) of said film and a LDPE resin was obtained.

Like in Example 30, the two-layer film of transparent vapor-deposited PET/LDPE was laminated with the resulting coextrusion film to form a flat pouch and then the oxygen concentration within the pouch was monitored. The results thus obtained are listed in the Table 3.

TABLE 3

| Example | Oxygen concentration within the pouch (%) | | | | | |
|---|---|---|---|---|---|---|
| | After 0 day | After 1 day | After 2 days | After 4 days | After 7 days | After 10 days |
| 30 | 20.9 | 19.0 | 14.5 | 3.4 | 0.2 | 0 |
| 31 | 20.9 | 19.8 | 16.4 | 7.8 | 2.1 | 0.4 |
| 32 | 20.9 | 19.7 | 16.1 | 5.8 | 1.2 | 0.0 |
| 33 | 20.9 | 20.2 | 17.6 | 4.4 | 0.7 | 0.0 |
| 34 | 20.9 | 19.4 | 16.0 | 4.0 | 0.5 | 0.0 |

The invention claimed is:

1. An oxygen-absorbing resin which is a copolyester obtainable by copolymerizing at least the following monomers (A)-(C):
   monomer (A): a dicarboxylic acid or derivative thereof comprising a carbon atom bonded to both of the following structures (a) and (b) and further bonded to one or two hydrogen atoms, the carbon atom being contained in an alicyclic structure:
   (a) a carbon-carbon double bond group; and
   (b) either a heteroatom-containing functional group, a bonding group derived therefrom, a carbon-carbon double bond group, or an aromatic ring;
   monomer (B): at least one member selected from the group consisting of dicarboxylic acids comprising an aromatic ring, derivatives thereof, hydroxycarboxylic acids comprising an aromatic ring and derivatives thereof; and
   monomer (C): diol;
   wherein the amount of monomer (A) unit in the oxygen-absorbing resin is 7.5 to 35 mol % and the amount of monomer (B) unit in the oxygen-absorbing resin is 15 to 42.5 mol %.

2. The oxygen-absorbing resin according to claim 1, wherein the carboxyl group or hydroxyl group contained in the monomer (B) directly bind to the aromatic ring.

3. The oxygen-absorbing resin according to claim 2, wherein the monomer (B) comprises phthalic acid or a derivative thereof.

4. The oxygen-absorbing resin according to claim 3, wherein the monomer (B) comprises terephthalic acid.

5. The oxygen-absorbing resin according to claim 4, wherein the monomer (B) comprises terephthalic acid and isophthalic acid.

6. The oxygen-absorbing resin according to claim 1, wherein the monomer (A) is a derivative of tetrahydrophthalic acid or tetrahydrophthalic anhydride.

7. The oxygen-absorbing resin according to claim 6, wherein the derivative of tetrahydrophthalic acid or tetrahydrophthalic anhydride comprises a derivative of $\Delta^3$-tetrahydrophthalic acid or $\Delta^3$-tetrahydrophthalic anhydride.

8. The oxygen-absorbing resin according to claim 7, wherein the derivative of $\Delta^3$-tetrahydrophthalic acid or $\Delta^3$-tetrahydrophthalic anhydride comprises 4-methyl-$\Delta^3$-tetrahydrophthalic acid or 4-methyl-$\Delta^3$-tetrahydrophthalic anhydride.

9. The oxygen-absorbing resin according to claim 1, wherein the monomer (C) comprises 1,4-butanediol.

10. The oxygen-absorbing resin according to claim 1, wherein the monomer (C) comprises 1,4-butanediol and 1,6-hexanediol.

11. The oxygen-absorbing resin according to claim 1, wherein the oxygen-absorbing resin is a copolyester obtainable by copolymerizing a monomer (D) selected from the group consisting of aliphatic dicarboxylic acids, aliphatic hydroxycarboxylic acids and derivatives thereof together with the monomers (A)-(C).

12. The oxygen-absorbing resin according to claim 11, wherein the monomer (D) comprises adipic acid.

13. The oxygen-absorbing resin according to claim 11, wherein the monomer (D) comprises succinic acid.

14. The oxygen-absorbing resin according to claim 1, wherein a glass transition temperature is in the range of −8 to 15° C.

15. The oxygen-absorbing resin according to claim 1, which does not contain any transition metal salt as an oxidation catalyst.

16. An oxygen-absorbing resin composition comprising the oxygen-absorbing resin according to claim 1.

17. The oxygen-absorbing resin composition according to claim 16, which further contains a thermoplastic resin.

18. The oxygen-absorbing resin composition according to claim 17, wherein the thermoplastic resin is polyethylene.

19. The oxygen-absorbing resin according to claim 1, which further contains a plasticizer.

20. An oxygen-absorbing container comprising an oxygen-absorbing layer consisting of the oxygen-absorbing resin according to claim 1.

21. The oxygen-absorbing container according to claim 20, which comprises an oxygen-barrier layer on the outside of the oxygen absorbing layer.

22. The oxygen-absorbing resin according to claim 12, wherein the amount of monomer (D) unit in the oxygen-absorbing resin is 1 to 15 mol %.

* * * * *